March 31, 1931. O. M. WALRATH 1,798,992
MEANS FOR CONTROLLING AUTOMATIC SIGNALING AND SAFETY DEVICE SYSTEMS
Filed Dec. 2, 1929 3 Sheets-Sheet 1
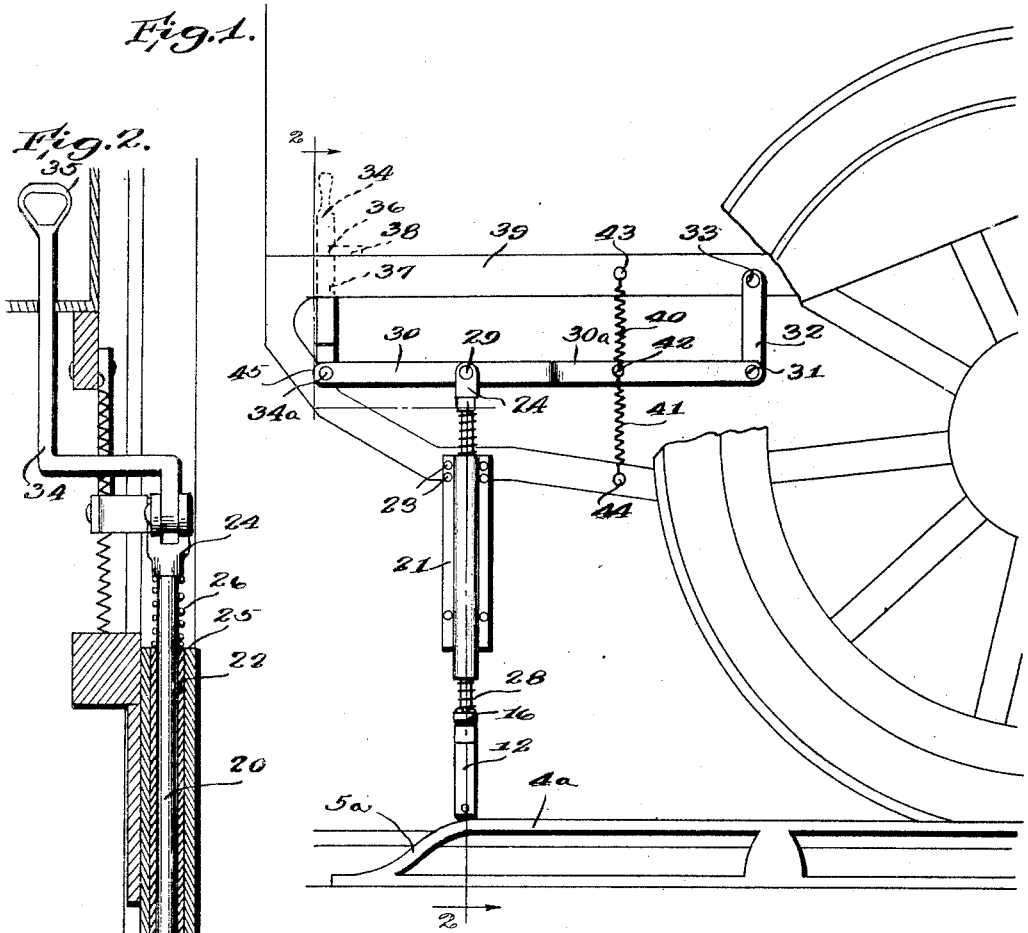
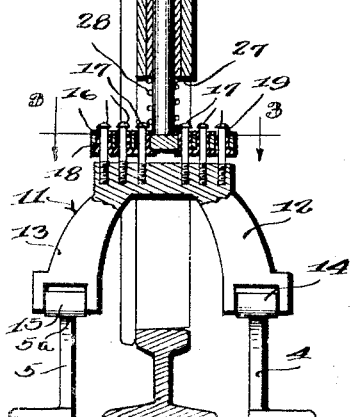
WITNESS
C. B. Shillinger
INVENTOR
Otis M. Walrath
BY Munn & Co.
ATTORNEY March 31, 1931.  O. M. WALRATH  1,798,992
MEANS FOR CONTROLLING AUTOMATIC SIGNALING AND SAFETY DEVICE SYSTEMS
Filed Dec. 2, 1929  3 Sheets-Sheet 2

WITNESS
C. B. Stillinger

INVENTOR
Otis M. Walrath
BY
ATTORNEY

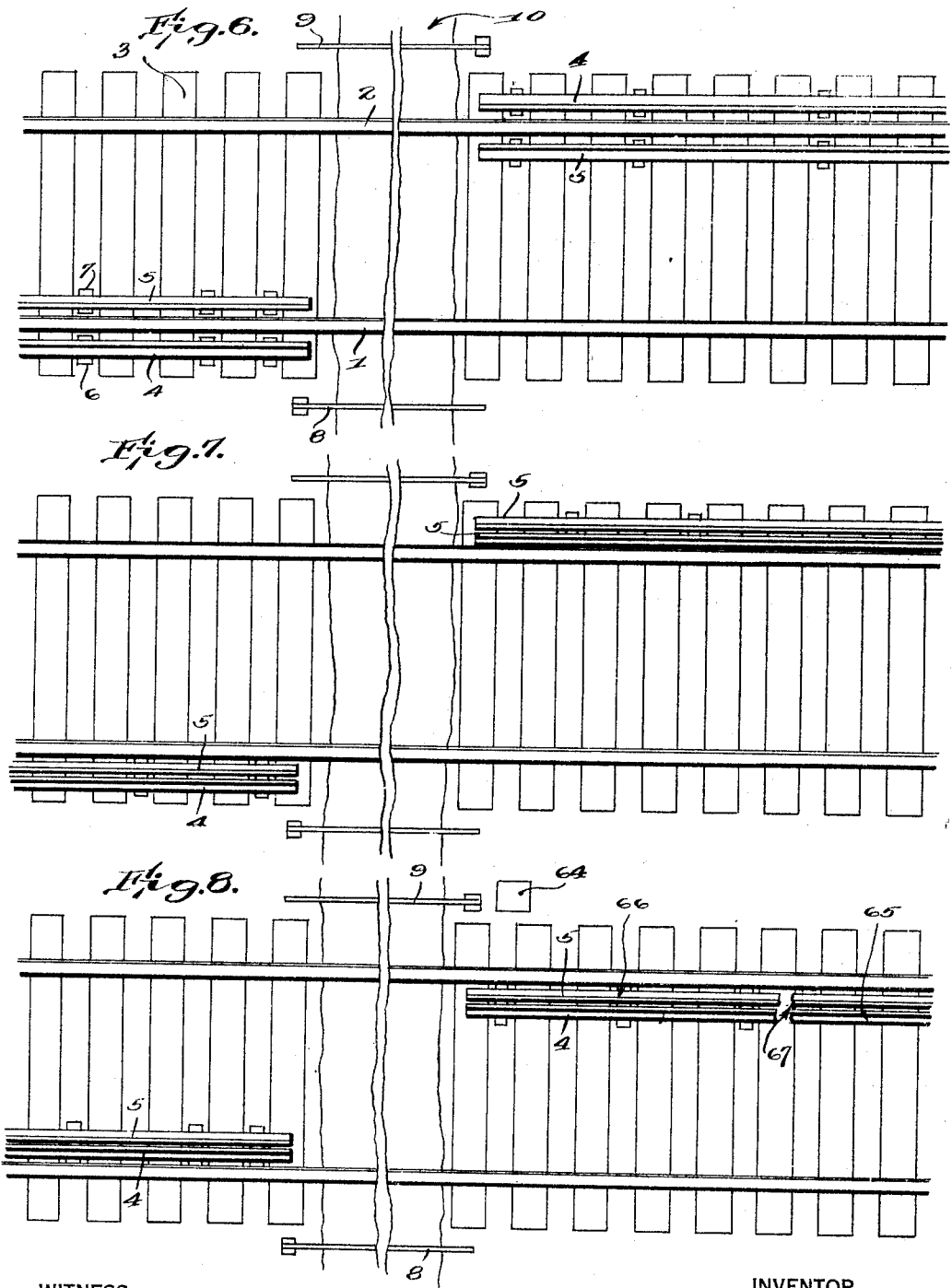

Patented Mar. 31, 1931

1,798,992

UNITED STATES PATENT OFFICE

OTIS M. WALRATH, OF ASHTABULA, OHIO

MEANS FOR CONTROLLING AUTOMATIC SIGNALING AND SAFETY-DEVICE SYSTEMS

Application filed December 2, 1929. Serial No. 411,083.

My invention relates to electrical connectors, more particularly to electrical connectors for controlling the electrical circuits operating automatic signals and safety device systems for use on railways and consists in the constructions, combinations and arrangements herein described and claimed.

This invention is designed for the operation of automatic signals and safety devices generally, but more particularly for the operation and control of the automatic gate described and claimed in my U. S. Patent No. 1,172,327.

An object of my invention is to provide an electrical connector adapted to be mounted on railroad vehicles, such as, locomotives, railway cars, trolley cars and etc., which by contacting electric conductors, comprised in the circuits of the signal or safety device to be operated, will operate said signals or said safety devices, etc. at desired times.

A further object of my invention is to provide a device of this type that is readily mountable on vehicles of the type described and in conventional use today without extensive modification thereof.

A further object of my invention is to provide an electrical connector of the type described which is normally automatically operated but which is adapted for manual operation if the occasion demands, thereby enabling the operator to render the signal or safety device inoperative when desired, doing away with the operation thereof by switching engines and engines otherwise operating or positioned in the control zone but not requiring the operation of the signal or safety device with consequent minimizing of the chances of confusion leading to probable loss of life through inadvertent operation of the signaling or safety device.

A further object of my invention is to provide a device of the type described in which the electric conductors may be independently mounted relative to the rails upon which said vehicle runs, thereby permitting of effective insulation, thereby doing away with the great loss of current due to leakage in ordinary electric connectors wherein the rails of the track and the wheels and axles are used for making the circuit.

A further object of my invention is to provide an electric connector for completing the circuit of a signaling or safety device for the operation thereof which is so positioned with reference to the signaling or safety device to be operated that it will properly actuate the same upon the approach of a train in either direction on either track of a railroad system, thereby doing away with the improper actuation of said signaling or safety device after the train has passed as in usual devices of this nature wherein the tracks are adapted for actuation of the signaling means on other tracks and improperly operate upon the passage of a train in the opposite direction.

A further object of my invention is to provide a device of the type described which has few parts, is easy to manufacture and does not get out of order easily.

Other objects and advantages will appear as the specification proceeds and the invention will be more particularly defined in the appended claims.

My device is illustrated in the accompanying drawings forming a part of this application, in which:—

Figure 1 is an elevational view of my device in operative position,

Figure 2 is a sectional view on line 2—2 of Figure 1,

Figure 3 is a sectional view on line 3—3 of Figure 2,

Figure 4:
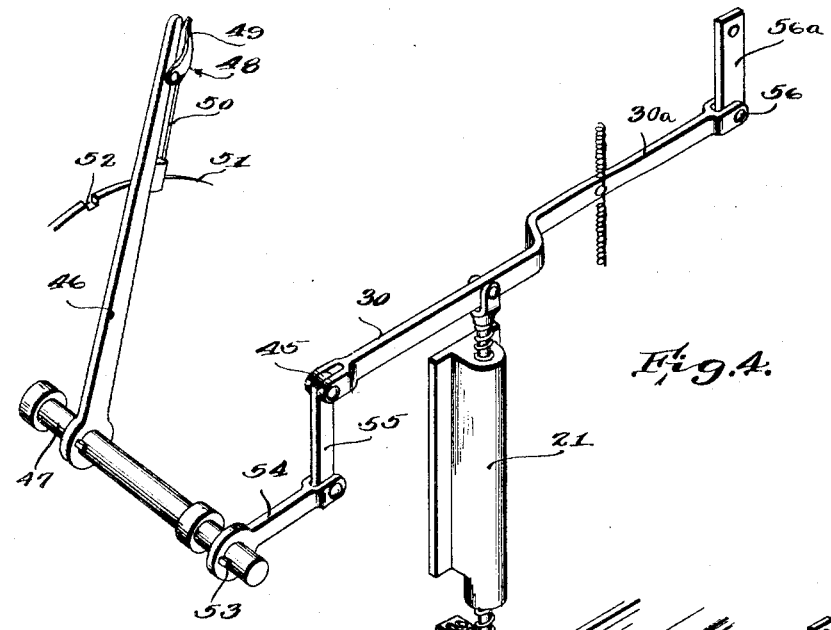
Figure 4 is a perspective view of a modified form of my device.

Figures 6 to 8 inclusive, are plan views showing various positions of the rail conductors of my device.

In carrying out my invention, I make use of an ordinary railway having rails 1 and 2 suitably mounted on the road-bed by ties 3.

In that form of the invention shown in Figures 1, 2, 3 and 6, I mount the electric conductor members which in this embodiment comprise the rails 4 and 5 tho they may consist of rods, cables, etc., of any suitable construction on either side of one of the rails 1 and 2, on the conductor supporting tie members 6 and 7, as more clearly appears in Figure 6. These tie members may be mounted on the ties 3, or in any other suitable manner as desired. These electric conductors 4 and 5 comprise a part of the electrical circuit controlling an automatic signal, a safety device or any other means it is desired to operate by my connector. In this preferred embodiment these conductors 4 and 5 are shown as projecting above track rails 1 and 2, tho they may be mounted of even height therewith, below the same, or in any other suitable manner desired.

In Figure 6, I have shown a safety gate comprising the two gate members 8 and 9 provided for the protection of cross traffic on the grade-crossing roads generally indicated at 10. The electric conductor members 4 and 5 have inclined portions 5a at their ends for a purpose soon to be described, and as appears more clearly in Figure 1.

For inter-connecting these electric conductor members 4 and 5 and causing the energization of the circuit controlling the automatic signal or safety device of which they are a part, I provide a yoke generally indicated at 11 and having the downwardly projecting arms 12 and 13. These downwardly projecting arms have mounted at their extremities contact rollers 14 and 15 or other suitable contact means, such as shoes, brushes, etc. These contact means 14 and 15, as appears from an examination of Figures 1 and 2 are adapted to conduct a current between said electric conductors through the yoke 11. This yoke 11 is mounted on, but insulated from a plate 16 by means of bolts 17 suitably bushed by insulating bushings 18 comprised therein. As a further means of insulating said bolts 17 from said plate 16, insulating washers 19 are provided. As shown in Figures 2 and 4 the plate 16 is spaced from the yoke 11, thus permitting an up and down movement of the yoke, independently of the operating rod, this movement accommodating slight inequalities in the track conductors.

Integral with said plate or head 16 is the slidable operating rod 20 mounted for reciprocation in guide bracket 21 and insulated from said bracket 21 by means of the insulating bushing 22. This guide bracket 21 is fixedly positioned on the frame or any other stationary part of the vehicle to which it is attached by any suitable means, such as indicated at 23. The upper end of this slidable operating rod 20 has a clevis 24 for a purpose soon to be described. Engageable between the upper shoulder 25 of the guide frame 21 and said clevis is a spring member 26. Similarly arranged below said frame member 21 and engaging said plate member 16 and the lower shoulder 27 of the frame 21 is a like spring 28. The purpose of these springs will be presently set forth.

Pivotally secured between the arms of said clevis 24, as shown at 29 is the floating lever 30. Pivoted at one end of this floating lever 30, as shown at 31 is the link 32 which is swivelled, as indicated at 33, to any fixed part of the vehicle, such as the frame thereof. At the opposite extremity of this floating lever 30 is a pull bar 34 pivotally mounted, as shown at 34a and having at its upper end a handle or stirrup 35, adapting the same to manual or foot operation. As indicated at 36 and 37, suitable notches are provided, adapted to engage a latch plate 38 positioned on the floor 39 of the engine cab or any other convenient position on the vehicle. The arm 30a of floating lever 30 has engageable therewith similar opposed tension springs 40 and 41 connected to said arm at point 42 and to fixed portions of the vehicle 43 and 44. It is readily apparent that movement of the arm 30a of lever 30 will tension one of these springs.

From the foregoing description the use and operation of my device will be readily understood. The electric conductor members 4 and 5 comprised in the circuit controlling the automatic signal or safety device are placed at any desired point along the railroad at which it is desired to operate said device. As in Figure 6 the conductor rails 4 and 5 are shown in one of several of the various positions in which they may be located when adapted to control a safety gate, such as that consisting of the members 8 and 9 for the protection of cross-traffic on a grade-crossing. The operating parts of my connector are mounted on the vehicle, as shown in Figure 1.

The parts are normally positioned as shown in Figure 1 to energize the circuit during the passing of the vehicle over its road-bed, the pull rod 34 being in the position shown in Figure 1 with the notch 36 engaging the plate 38 for retaining the same in said position. The yoke 11 is thus retained in its normal operative position which is slightly below the top surface 4a and 5a of the electric conductor members 4 and 5. When the vehicle passes over the conductor members 4 and 5, the contact members 14 and 15 will engage the sloped portions 5a of the electric conductor members 4 and 5 forcing the said yoke member 11 upwardly, thereby compressing the spring 28 and tensioning spring 26. These springs act as buffers to absorb the shocks incident to the engagement of said contacts 14 and 15 with the electric conductor members 4 and 5 in a manner easily understood. The springs 40 and 41 connected to the floating lever 30 further act in a similar fashion to absorb said shocks. It is evident that when the contacts 14 and 15 are engaged with said electric conductor members 4 and 5 the circuit in which said conductor members are comprised will be energized, thereby operating any device desired.

When the operator desires to break the circuit in which the electric conductor members 4 and 5 are comprised, so as to return the device to an inoperative position or for any other purpose desired, the pull bar 34 is elevated so that the lower notch 37 engages plate 38. This movement raises yoke 11 with contacts 14 and 15 from the electric conductor members 4 and 5, thereby breaking the circuit. This rectilinear movement of yoke 11 and its rod 20 is secured by means of the freely swingable mounting of the floating lever 30 on the link 32. This swingably mounted floating lever 30 on link 32 compensates for the arcuate movement which would normally occur if said floating lever 30 were swung about a fixed point at 31 by pull rod 34. Occasion for such manual operation might arise when the vehicle is stopped on the electric conductor members or it is not desired to operate the signal or safety device for any other reason.

In that form of my invention shown in Figure 4, I have provided a modified means for actuating the yoke 11 having contacts 14 and 15 to operative and inoperative positions. In this form of the device instead of raising the end 45 of floating lever 30 by means of a pull rod, I provide an operating handle or pull lever 46 suitably keyed or otherwise fixedly secured to a tumbling shaft 47 mounted in the frame of the vehicle. This pull lever 46 is equipped with any suitable form of latch means, such as 48, adapted to secure the same in different positions. The latch means 48 used in this instance comprise the lever 49, latch bolt 50 and a quadrant 51 having notches 52 therein for engagement with said bolt 50. Keyed on another part of this tumbling shaft 47, as indicated at 53 is the rocker arm 54 which is connected to the end 45 of rocking lever 30 by a link 55. The arm 39 of floating lever 30 is mounted to a swivelled link 56a, as shown at 56.

The operation of this form of my device is substantially similar to the operation of the preceding form. When the pull lever 46 is thrown forward the floating lever 30 lowers yoke 11 causing contacts 14 and 15 to engage with electric conductor members 4 and 5. This is the normal position of the connector for automatic operation. The swivelled link 55 connecting rocker arm 54 and 30 in conjunction with the swivelled portion 39 of floating lever 30 on link 56a will compensate for the natural arcuate movement of the lever about its pivot.

When the operator desires to actuate the connector to an inoperative position, the pull lever is drawn backwardly, thereby raising the yoke 11 carrying the contacts 14 and 15 in a manner easily understood.

Figure 5:
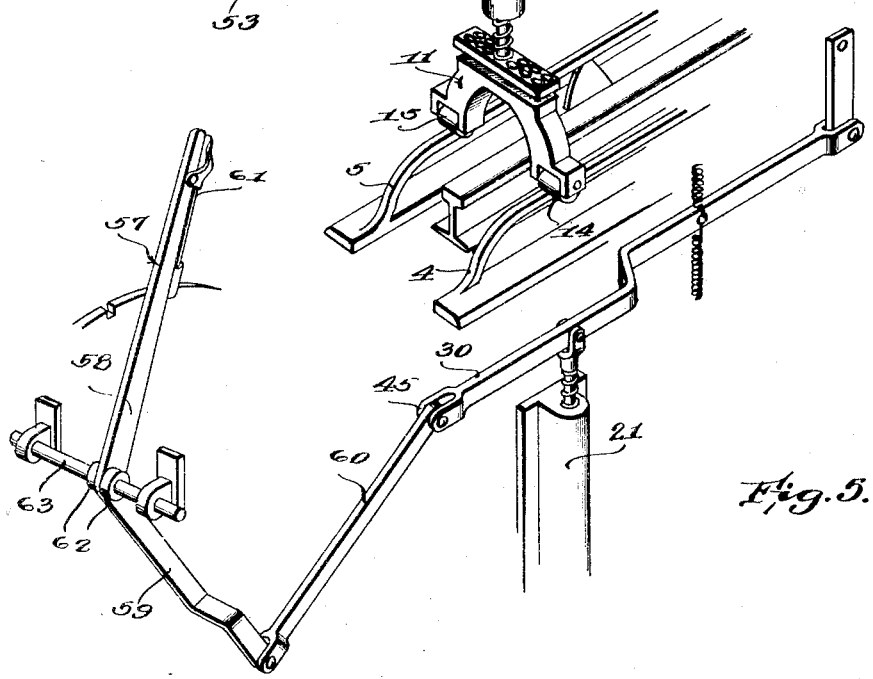
Figure 5 is a perspective view of a further modified form of my device.

Referring more particularly to Figure 5 it will be seen that I have provided a further specific form of operating means for my connector. In this form of the invention, I raise and lower the floating lever 30 by means of a pull lever substantially in the form of a rocker lever 57 having the actuating arm 58 and the operating arm 59 connected to the end 45 of floating lever 30 by suitable link means, such as 60. This actuating lever 57 is provided with a latch means 61 exactly similar to the corresponding latch means, shown in the modification of Figure 4 and which requires no further description. Suitable collars 62 are also provided adjacent said rocker lever 57 for preventing longitudinal movement thereof on its fulcrum means 63.

The operation of this form of the device is substantially similar to the preceding form. The lever 57 in the forward position lowers the yoke 11 for the connecting operation. When the lever is swung backwardly engaging in the rear notch on the quadrant of its latching means, the yoke 11 is raised from the electric conductor members and the circuit is broken.

The electric conductor members 4 and 5 may be arranged on the outside of the rails of the track as shown in Figure 7 or on the inside thereof, as shown in Figure 8 or in any other position desired.

In Figure 8 my device is shown adapted to actuate a signaling means 64 as well as the safety gates 8 and 9 in proper sequence for protecting cross traffic on the cross-roads. The electric conductors 4 and 5 are provided in this case each in two sections as shown at 65 and 66 separated as shown at 67. The electric conductors for the actuation of both the signal means 64 and the safety gates 8 and 9 may consist of single electric conductors 4 and 5 separated by suitable insulation instead of being placed in spaced relation as shown in said figure.

It is obvious that upon the passage of a train over these electric conductors, the signaling device 64 will first be actuated, thereby warning cross traffic of the passage of a train after which the safety gates 8 and 9 will be moved to closed position, thereby preventing the passage of cross traffic. The electric conductors of Figs. 6 and 7 may be similarly suitably insulated or separated in the same manner as the electric conductors of Figure 8 for the operation of a signaling and safety device in the same manner as shown in Figure 8.

It is also within the scope of my invention to mount a plurality of these connectors on a vehicle or a train as desired, for example, in case of a long train it would be advisable to mount one of these devices on the engine in any desired position and another on the last car or pilot car of the train in order that the whole train might pass a specific point during the operation of a signal or that a safety device might be operated until the entire train has passed a specific point.

It is thus seen that I have provided an electric connector that is adapted to properly actuate a signaling or safety device upon the passage of a train in either direction over a track of a railroad equipped with my device.

It is also easily seen that because of the manual means for controlling the completion of the circuit of the signaling or safety device said signaling or safety device will not be actuated inadvertently when an engine happens to be within the zone of control of said circuit merely temporarily in such a position or in such operation that the actuation of said signaling or safety device is unnecessary. It can easily be seen that this manual means at the control of the operator could be used to prevent the operation and inoperation of the signaling or safety device by such a train thereby leaving the same to be properly actuated by the passage of a train in the usual fashion requiring the operation of said signaling or safety device thus preventing loss of life or serious injury resulting from the improper actuation of said signaling or safety device.

I claim:

1. A train operated circuit closing mechanism comprising a vehicle, track way, and electrical conductors disposed along the sides thereof, an elongated bracket carried by said vehicle having an elongated insulated sleeve, a rod reciprocable through said sleeve and having a yoke member upon the lower end thereof adapted to contact with said electrical conductors, a spring confined between said yoke and the lower end of said sleeve, a swingable link mounted upon the vehicle and secured intermediate its ends to the upper end of said rod, a spring confined between said link and the upper end of said sleeve, and manual means for moving said link to raise and lower said yoke into and out of contact with said conductors.

2. A train operated mechanism for signals and the like comprising a vehicle and track way, electrical conductors disposed upon said track way, a bracket mounted upon said vehicle including an elongated tubular sleeve having an insulator shell therein, a floating lever carried by said vehicle, a rod slidable through said insulator shell, the upper end of said rod being connected intermediate the length of said floating lever and having a planiform head at its lower end, a yoke having a portion complemental to said head but spaced therefrom and having contact members for engagement with said electrical conductors, a plurality of fastening means extended through said head and engaged in said yoke, said fastening means being insulated from said head and forming binding posts for electrical circuits, resilient means between said planiform head and said tubular sleeve and between said floating lever and the upper end of said sleeve and manual means connected to one end of said floating lever to raise and lower said yoke into and out of contact with said electrical conductors.

OTIS M. WALRATH.